(12) United States Patent
Bai et al.

(10) Patent No.: US 8,831,224 B2
(45) Date of Patent: Sep. 9, 2014

(54) METHOD AND APPARATUS FOR SECURE PAIRING OF MOBILE DEVICES WITH VEHICLES USING TELEMATICS SYSTEM

(75) Inventors: Fan Bai, Ann Arbor, MI (US); Nader M. Rabadi, Plantation, FL (US); David P. Pop, Garden City, MI (US); John J. Correia, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 13/618,063

(22) Filed: Sep. 14, 2012

(65) Prior Publication Data
US 2014/0079217 A1   Mar. 20, 2014

(51) Int. Cl.
*H04L 9/32* (2006.01)
*G06F 21/43* (2013.01)
*H04L 9/28* (2006.01)
*H04W 12/04* (2009.01)

(52) U.S. Cl.
CPC . *H04L 9/28* (2013.01); *H04W 12/04* (2013.01)
USPC ...... 380/270; 726/4; 726/6; 726/10; 713/153; 713/168; 455/411; 455/569.2

(58) Field of Classification Search
None
See application file for complete search history.

(56) References Cited

U.S. PATENT DOCUMENTS

| | | | |
|---|---|---|---|
| 2007/0189528 A1* | 8/2007 | Ueda | 380/44 |
| 2009/0063863 A1* | 3/2009 | Durand et al. | 713/171 |
| 2009/0307483 A1* | 12/2009 | Falk et al. | 713/153 |
| 2011/0086668 A1* | 4/2011 | Patel | 455/556.1 |
| 2011/0112969 A1* | 5/2011 | Zaid et al. | 705/50 |
| 2012/0328101 A1* | 12/2012 | Lakshminarayanan | 380/258 |
| 2013/0227656 A1* | 8/2013 | Holtmanns et al. | 726/4 |

OTHER PUBLICATIONS

Medium Access Control (MAC) Quality of Service (QoS) Enhancements, IEEE P802_11e/D13.0, Jan. 2005.*

* cited by examiner

*Primary Examiner* — Jung Kim
*Assistant Examiner* — Janusz Kusyk
(74) *Attorney, Agent, or Firm* — John A. Miller; Miller IP Group, PLC

(57) ABSTRACT

A method for establishing secure wireless communications between a mobile device and a vehicle, where a user is not required to enter a password, but instead the telematics system is used to bootstrap the trust between the mobile device and the vehicle. The user initiates the process by pressing a button on the mobile device to request pairing. The vehicle uses its secure OnStar cellular communication link to verify the mobile device with the OnStar server, which generates and sends a session key to the vehicle via the vehicle-OnStar cellular connection, and also sends the session key to the mobile device via the device's own cellular connection. The session key serves as a shared secret, such that the vehicle can issue a secrecy challenge to the mobile device. When the mobile device responds appropriately, a trusted wireless communications link can be established between the mobile device and the vehicle.

15 Claims, 5 Drawing Sheets

METHOD AND APPARATUS FOR SECURE PAIRING OF MOBILE DEVICES WITH VEHICLES USING TELEMATICS SYSTEM

BACKGROUND OF THE INVENTION

1. Field of the Invention

This invention relates generally to securing wireless communications between a mobile device and a vehicle and, more particularly, to a method for secure pairing of a mobile device with a vehicle which uses OnStar as a trusted out-of-band medium to authenticate wireless communications between the mobile device and the vehicle.

2. Discussion of the Related Art

Personal electronic devices have become an important and common part of people's everyday lives. Many people take a smart phone with them everywhere they go—for phone communications, internet access, text messaging, and various other applications. Many such people also spend a lot of time in their vehicle, and they expect their smart phone or other mobile device to be able to communicate with the vehicle. For example, it is desirable for phone calls to be placed or received in a hands-free fashion through the vehicle's audio system when a phone is inside the vehicle. This type of integration requires secure, reliable communications between the phone, or other mobile device, and the vehicle.

Bluetooth is a protocol which is widely used for wireless communications between mobile devices and vehicles. Bluetooth can support hands-free phone operation between a mobile phone and the vehicle, playing music in the vehicle from an MP3 player, and other features. Some vehicles now offer simplified pairing—or establishment of secure wireless communications—between Bluetooth mobile devices and the vehicle. However, for reasons of performance, functionality and security, in-cabin wireless local area network, or Wi-Fi, is envisioned as a preferred architecture for next-generation connectivity between mobile devices and vehicles.

Although Wi-Fi offers good security and functionality, it is challenging to establish secure Wi-Fi connectivity between a mobile device and a vehicle while maintaining user-friendliness. Encrypted communications may be established by making use of a shared secret, which typically requires a user to key in a password on the mobile device. Keying in the password can be cumbersome, and it certainly cannot be done while the vehicle is being driven. It would be desirable to enable secure Wi-Fi communications between a mobile device and a vehicle without requiring the manual entry of a password, by using an existing trusted out-of-band source to establish a shared secret.

SUMMARY OF THE INVENTION

In accordance with the teachings of the present invention, a method and system are disclosed for establishing secure wireless communications between a mobile device and a vehicle, where a user is not required to enter a password, but instead the telematics system (such as OnStar) is used to bootstrap the trust between the mobile device and the vehicle. The user initiates the process by simply pressing a button on the mobile device to request pairing. The vehicle uses its secure OnStar cellular communication link to verify the mobile device with the OnStar server, which generates a session key and sends the session key back to the vehicle via the vehicle-OnStar cellular connection, and also sends the session key to the mobile device via the device's own cellular connection. The session key serves as a shared secret, such that the vehicle can issue a secrecy challenge to the mobile device. When the mobile device responds appropriately, a trusted wireless communications link can be established between the mobile device and the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and apparatus for secure pairing of mobile devices with vehicles using the OnStar system is merely exemplary in nature, and is in no way intended to limit the invention or its applications or uses.

Most modern vehicles support wireless connectivity of onboard mobile devices with the vehicle. Bluetooth is one technology which is commonly used for such wireless connectivity. Bluetooth pairing, or establishing secure wireless communications, can be accomplished via Secure Simple Pairing (SSP). While this approach is convenient for the user, it may be vulnerable to a Man-In-The-Middle attack.

In-cabin wireless local area network, or Wi-Fi, is envisioned as the preferred next-generation technology for providing connectivity between smart phones and other mobile devices and vehicles in which they reside. Wi-Fi offers secure, high-bandwidth, high-functionality communications between vehicles and mobile devices. However, establishing secure, encrypted Wi-Fi communications between a mobile device and a vehicle typically requires a user to enter a lengthy password on the mobile device. It would be desirable to avoid this password entry.

Figure 1:
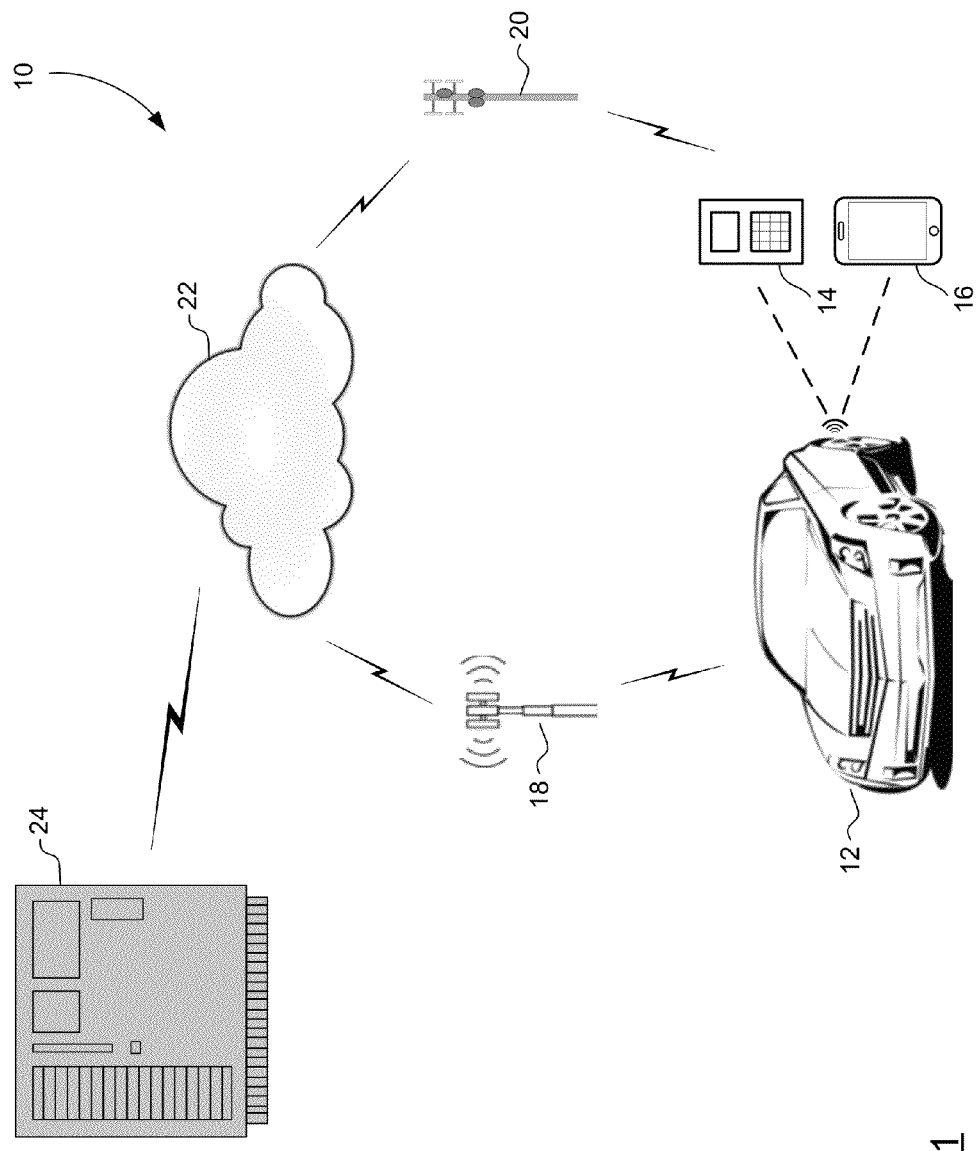
FIG. 1 is a schematic diagram showing the architecture of a system for secure pairing of mobile devices with a vehicle using the OnStar system to establish trust.

FIG. 1 is a schematic diagram showing the architecture of a system 10 for secure pairing of mobile devices with a vehicle using a telematics system (such as OnStar) to establish trust. The basic philosophy is to authenticate two communicating devices using a trusted third-party or "out-of-band" medium. In the system 10, a vehicle 12 hosts a Wi-Fi network which mobile devices 14 and 16 desire to join. The mobile devices 14 and 16 are presumed to be within, or in close proximity to, the vehicle 12. The vehicle 12 has access to a telematics service, such as OnStar, via a cellular service provider 18. The mobile devices 14 and 16 receive phone and data services through a cellular service provider 20, which may be the same service provider as the cellular service provider 18 or may be different. Both the cellular service provider 18 and the cellular service provider 20 communicate with the internet 22, from which an OnStar server 24 may be reached. With this architecture, the Wi-Fi trust between the vehicle 12 and the mobile devices 14 and 16 can be bootstrapped, or self-enabled, by using the OnStar server 24 as a trusted out-of-band medium.

In the system 10, it is assumed that both of the cellular communication links—from the vehicle 12 to the cellular service provider 18, and from the mobile devices 14 and 16 to the cellular service provider 20—are secure. It is also assumed that the communication links from the cellular service providers 18 and 20 to the internet 22, and from the OnStar server 24 to the internet 22, are secure.

In the following discussion, the mobile device 14 will serve as a primary device, typically belonging to the driver of the vehicle 12. The mobile device 16 will serve as a guest device belonging to a passenger in the vehicle 12. The distinction between a primary device and a guest device is that, once a primary device has established communications with the vehicle 12, a guest device request to join the Wi-Fi network may be granted only with approval of the user of the primary device. Two different methods of establishing a trust between the vehicle 12 and the mobile device 14 will be discussed below. Other methods may also be envisioned.

Table 1 is a list of notations which will be used in the following discussion.

TABLE 1

| | |
|---|---|
| (EPvV, EPuV) | Ephemeral private/public keys pair generated by Vehicle 12 |
| (EPvD, EPuD) | Ephemeral private/public keys pair generated by Device 14 |
| (SPvV, SPuV) | Static private/public keys pair belonging to Vehicle 12 |
| (SPvD, SPuD) | Static private/public keys pair belonging to Device 14 |
| (SPvO, SPuO) | Static private/public keys pair belonging to OnStar Server 24 |
| S_VO | Symmetric secret key that is shared between Vehicle 12 and OnStar Server 24 |
| S_DO | Symmetric secret key that is shared between Device 14 and OnStar Server 24 |
| ADDR_V | Device address of Vehicle 12 |
| ADDR_D | Device address of Device 14 |
| CNT_V | Up-counter belonging to Vehicle 12 |
| CNT_D | Up-counter belonging to Device 14 |
| CNT_O | Up-counter belonging to OnStar Server 24 |
| T | Timestamp |
| SigGen(x, m) | Signature generation algorithm using a private key x on message m |
| SigVal(y, m) | Signature validation algorithm using a public key y on message m |
| DH(a, b) | Diffie-Hellman algorithm using public key a and private key b |
| SEnc(k, m) | Symmetric encryption using secret key k on plain text message m |
| SDec(k, m) | Symmetric decryption using secret key k on cipher text message m |
| AEnc(y, m) | Asymmetric encryption using public key y on plain text message m |
| ADec(x, m) | Asymmetric decryption using private key x on cipher text message m |

Figure 2:
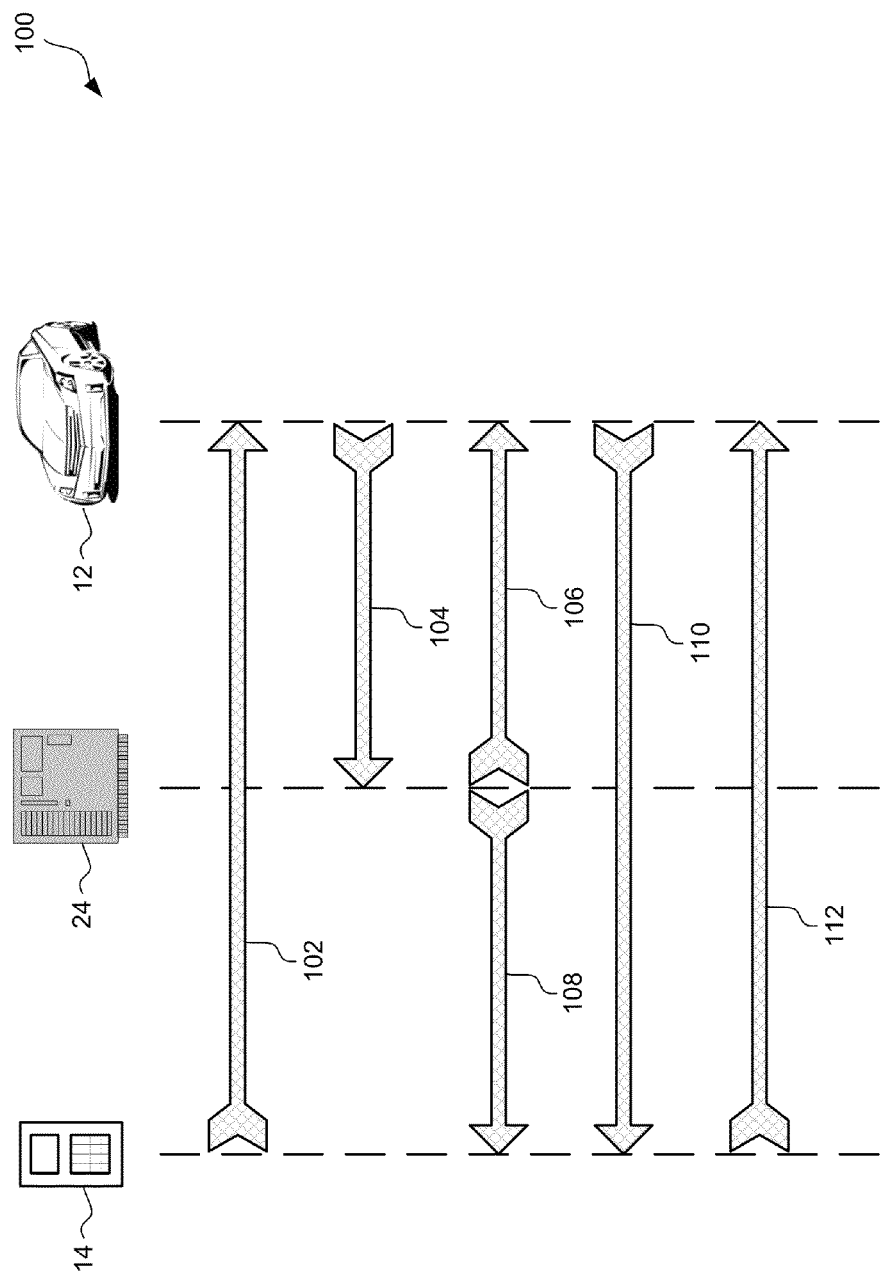
FIG. 2 is an illustration of the communication steps which take place between a mobile device, a vehicle and the OnStar system in a first embodiment of a method used by the system of FIG. 1.

FIG. 2 is an illustration 100 of the communication steps which take place between the mobile device 14, the vehicle 12 and the OnStar server 24 in a first embodiment of a method used by the system 10 of FIG. 1. The large arrows represent the flow of information from one party to another. In step 102, the mobile device 14 issues a pairing request to the vehicle 12. The pairing request at the step 102 includes a message containing the device address of the mobile device 14, ADDR_D, along with a request identification number, Req. The address of the mobile device 14, ADDR_D, can be any suitable address, such as a MAC address, an IP address, or a Bluetooth address. As discussed earlier, it is desirable to make the initiation of the pairing request as simple as possible for the user. An application could be developed to run on the device 14, such that the user simply needs to run the application (literally one button push) to initiate the pairing. The application would handle all incoming and outgoing communications from that point on until Wi-Fi pairing of the device 14 with the vehicle 12 is achieved.

In step 104, the vehicle 12 sends a device verification message to the OnStar server 24. The device verification message consists of a string n and a signature SG. The string n is composed of a concatenation of four items; the device address of the vehicle 12, ADDR_V, which is known to the vehicle 12; the device address of the mobile device 14, ADDR_D, which was received in the pairing request message; a counter or sequence number belonging to the vehicle 12, CNT_V; and a timestamp, T. The string n is thus a unique string which identifies the two entities which wish to be paired, along with a counter number and timestamp. The signature SG is generated by a signature generation algorithm using the private key of the vehicle 12 on the string n. The vehicle 12 then sends the string n concatenated with the signature SG, to the OnStar server 24.

Also in step 104, the OnStar server 24 validates the signature SG using the public key corresponding to the private key used by the vehicle 12 to create the signature SG. Upon validation of the signature SG, the OnStar server 24 generates a session key s to be used in subsequent steps.

In step 106, the OnStar server 24 notifies the vehicle 12 with a message consisting of a string c1 concatenated with a signature SG1. The string c1 is created as a symmetric encryption using a secret key S_VO which is shared between the vehicle 12 and the OnStar server 24. The secret key S_VO is used on the plain text session key s created in step 104. The signature SG1 is generated by a signature generation algorithm using the private key of the OnStar server 24 on the string c1. The message containing the string c1 concatenated with the signature SG1 is then sent from the OnStar server 24 to the vehicle 12.

In step 108, which occurs in parallel with the step 106, the OnStar server also sends the session key s, which serves as a shared secret, to the mobile device 14. In the step 108, the OnStar server 24 notifies the device 14 with a message consisting of a string c2 concatenated with a signature SG2. The string c2 is created as a symmetric encryption using a secret key S_DO which is shared between the device 14 and the OnStar server 24. The secret key S_DO is used on the plain text session key s created in step 104. The signature SG2 is generated by a signature generation algorithm using the private key of the OnStar server 24 on the string c2. The message containing the string c2 concatenated with the signature SG2 is then sent from the OnStar server 24 to the device 14.

Also, in the steps 106 and 108, the vehicle 12 and the device 14 validate the signatures in the messages they have received from the OnStar server 24. As a result of the steps 106 and 108, both the vehicle 12 and the mobile device 14 are in possession of the session key s created by the OnStar server 24. Because the communications from the OnStar server 24 to the vehicle 12 and the mobile device 14 are securely encrypted, the session key s will be known only to the vehicle 12 and the mobile device 14—unable to be intercepted by an eavesdropper or other malicious agent. The session key s can thus be used as a secret key for encrypted communications between the vehicle 12 and the mobile device 14.

In step 110, the vehicle 12 generates a random number r. The vehicle 12 then sends a secrecy challenge to the device 14. The secrecy challenge consists of a message c3 which is a symmetric encryption using the session key s as a secret key, on a string which is the random number r concatenated with the address of the vehicle 12, ADDR_V. The mobile device 14, which knows the session key s, can perform a symmetric decryption of the message c3, thus learning the random number r and the address of the vehicle 12, ADDR_V.

In step 112, the device 14 responds to the secrecy challenge by sending a message c4 which is a symmetric encryption using the session key s as a secret key, on a string which is the random number r concatenated with the address of the device 14, ADDR_D. When the vehicle 12 decrypts the message c4 and verifies the correctness of the random number r and the address of the device 14, ADDR_D, the vehicle 12 then admits the mobile device 14 to its Wi-Fi network. Secure wireless communications are then possible between the vehicle 12 and the mobile device 14, as the shared secret (the session key s) ensures that no eavesdropping or Man-In-The-Middle is possible.

Figure 3:
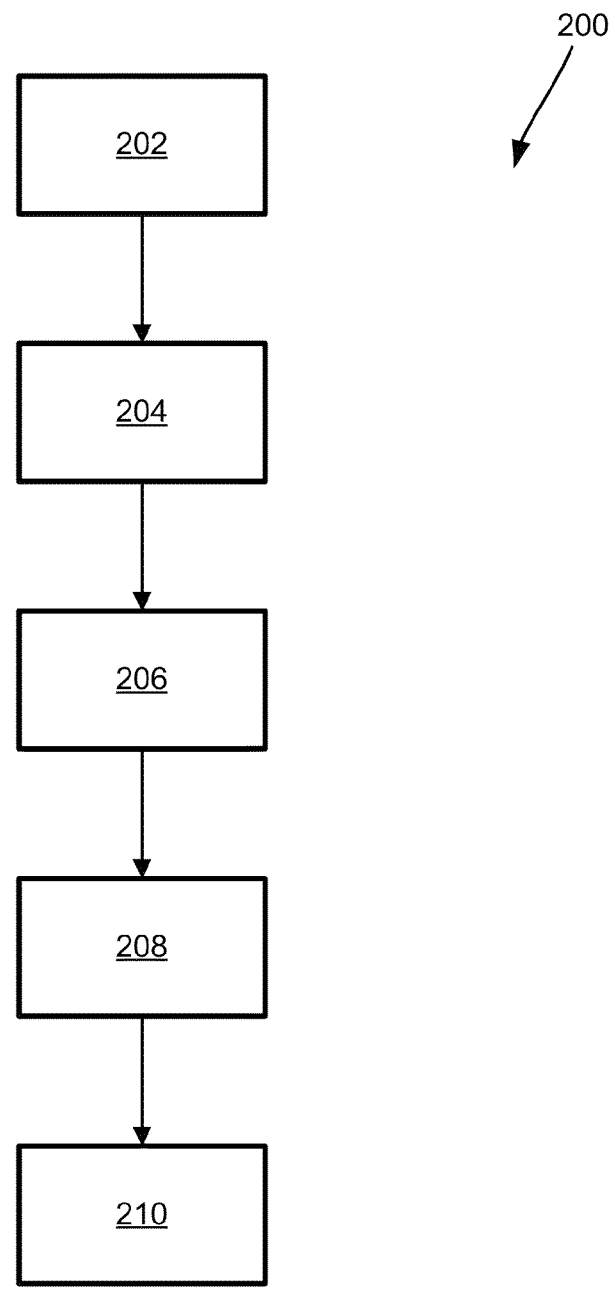
FIG. 3 is a flowchart diagram of the first embodiment of the method for secure pairing of a mobile device with a vehicle using the OnStar system to establish trust.

FIG. 3 is a flowchart diagram 200 of the first embodiment of the method for secure pairing of the mobile device 14 with the vehicle 12 using the OnStar server 24 to establish trust, as detailed above in the discussion of FIG. 2. At box 202, the mobile device 14 sends a pairing request to the vehicle 12, including a message containing the address of the device 14 (ADDR_D) and the request identification number (Req). At box 204, the vehicle 12 sends to the OnStar server 24 a message containing the addresses of the vehicle 12 and the device 14 (ADDR_V and ADDR_D) and unique identifying information (CNT_V and T), signed with a digital signature SG. The OnStar server 24 validates the signature SG.

At box 206, the OnStar server 24 generates a session key s. The OnStar server 24 then sends encrypted messages to both the vehicle 12 and the mobile device 14, where the messages are encrypted using symmetric secret keys shared between the OnStar server 24 and the vehicle 12 and the device 14, respectively, and the messages contain the session key s. The vehicle 12 and the device 14 decrypt the messages using their appropriate symmetric secret key, thus obtaining the session key s.

At box 208, the vehicle 12 generates a random number r, concatenates the number r with its address ADDR_V, and encrypts the concatenated string using the session key s. The vehicle 12 then sends the encrypted string to the device 14 as a secrecy challenge. At box 210, the device 14 decrypts the string using the session key s, thus obtaining the random number r. The device 14 then sends a message back to the vehicle 12, where the message contains r and the device's address ADDR_D, and the message is again encrypted with the session key s. The vehicle 12 admits the mobile device 14 into the Wi-Fi network upon verifying the correctness of the random number r.

Figure 4:
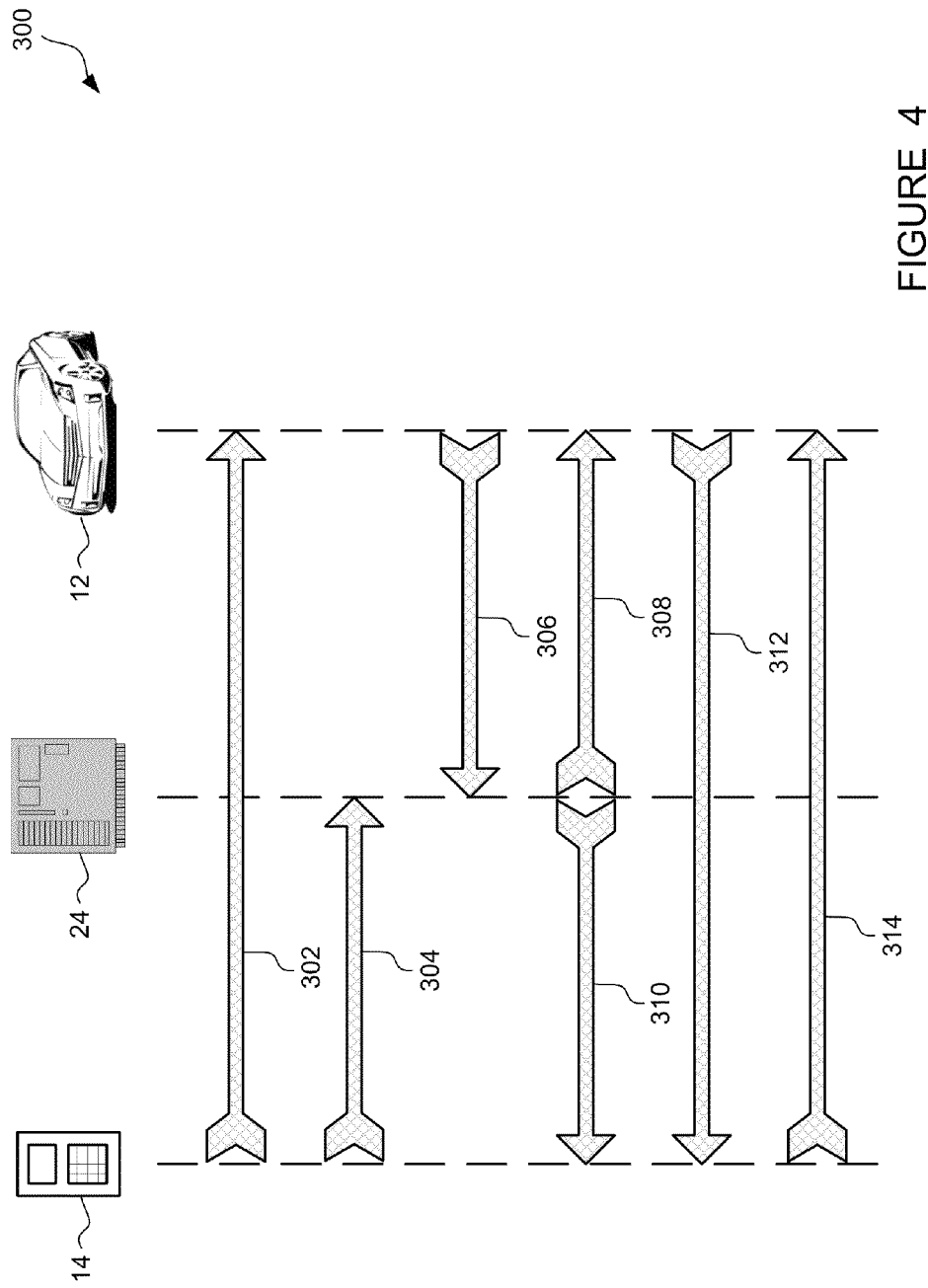
FIG. 4 is an illustration of the communication steps which take place between a mobile device, a vehicle and the OnStar system in a second embodiment of a method used by the system of FIG. 1.

FIG. 4 is an illustration of the communication steps which take place between the mobile device 14, the vehicle 12 and the OnStar server 24 in a second embodiment of a method used by the system of FIG. 1. As mentioned previously, using the OnStar server 24 as a trusted out-of-band medium to bootstrap trust between the vehicle 12 and the device 14 is an idea that can be implemented in multiple ways. In the second embodiment discussed here, a different set of communication steps are used, in conjunction with additional cryptographic concepts, to again achieve a trust relationship between the vehicle 12 and the mobile device 14.

In step 302, the mobile device 14 issues a pairing request to the vehicle 12. The pairing request at the step 302 includes a message containing the device address of the mobile device 14, ADDR_D, along with a request identification number, Req. In step 304, the mobile device 14 sends a verification message to the OnStar server 24. The device 14 first generates an ephemeral pair of private/public keys (EPvD,EPuD). Then the device 14 creates a message m2 which is a concatenation of the device's ephemeral public key EPuD, the device address ADDR_D, the device counter CNT_D and a timestamp T. The device 14 then creates a signature SG2 using its static private key SPvD on the message m2, and sends the message m2 concatenated with the signature SG2 to the OnStar server 24.

Also in step 304, the OnStar server 24 validates the message m2 and the signature SG2 using the public key corresponding to the private key used by the device 14 to create the signature SG2.

In step 306, upon receipt of the pairing request, the vehicle 12 generates its own ephemeral pair of private/public keys (EPvV,EPuV) and sends a verification message to the OnStar server 24. The verification message consists of a string m3 and a signature SG3. The string m3 is composed of a concatenation of four items; the vehicle's ephemeral public key EPuV; the vehicle's device address ADDR_V; a counter belonging to the vehicle 12, CNT_V; and a timestamp T. The signature SG3 is generated by a signature generation algorithm using the static private key of the vehicle 12, SPvV, on the string m3. The vehicle 12 then sends the string m3 concatenated with the signature SG3, to the OnStar server 24.

Also in step 306, the OnStar server 24 validates the message m3 and the signature SG3 using the public key corresponding to the private key used by the vehicle 12 to create the signature SG3.

In step 308, the OnStar server 24 notifies the vehicle 12 with a message consisting of a string m4 concatenated with a signature SG4. The string m4 is composed of a concatenation of four items; the device's ephemeral public key EPuD; the device's address ADDR_D; a counter belonging to the OnStar server 24, CNT_O; and a timestamp T. The values of EPuD and ADDR_D were received by the OnStar server 24 in the message m2 from the mobile device 14. The signature SG4 is generated by a signature generation algorithm using the private key of the OnStar server 24 (SPvO) on the message string m4. The message containing the string m4 concatenated with the signature SG4 is then sent from the OnStar server 24 to the vehicle 12.

In step 310, the OnStar server 24 notifies the device 14 with a message consisting of a string m5 concatenated with a signature SG5. The string m5 is composed of a concatenation of four items; the vehicle's ephemeral public key EPuV; the vehicle's device address ADDR_V; a counter belonging to the OnStar server 24, CNT_O; and a timestamp T. The values of EPuV and ADDR_V were received by the OnStar server 24 in the message m3 from the vehicle 12. The signature SG5 is generated by a signature generation algorithm using the private key of the OnStar server 24 (SPvO) on the message string m5. The message containing the string m5 concatenated with the signature SG5 is then sent from the OnStar server 24 to the mobile device 14.

In step 312, the vehicle 12 computes a session key s using the Diffie-Hellman algorithm applied to the ephemeral private key of the vehicle 12 (EPvV) and the ephemeral public key of the device 14 (EPuD). Diffie-Hellman is an algorithm which allows two devices to generate a shared secret key based on other data which need not be securely communicated. Also in the step 312, the vehicle 12 generates a random number r. The vehicle 12 then sends a secrecy challenge to the device 14. The secrecy challenge consists of a message c1 which is a symmetric encryption using the session key s as a secret key, on a string which is the random number r concatenated with the address of the vehicle 12, ADDR_V.

In step 314, the mobile device 14 computes the same session key s by using the Diffie-Hellman algorithm applied to the ephemeral public key of the vehicle 12 (EPuV) and the ephemeral private key of the device 14 (EPvD). The device 14 can then perform a symmetric decryption of the message c1, thus learning the random number r and the address of the vehicle 12, ADDR_V. Also in step 314, the device 14 responds to the secrecy challenge by sending a message c2 which is a symmetric encryption using the session key s as a secret key, on a string which is the random number r concatenated with the address of the device 14, ADDR_D. When the vehicle 12 decrypts the message c2 and verifies the correctness of the random number r and the address of the device 14, ADDR_D, the vehicle 12 then admits the mobile device 14 to its Wi-Fi network. Secure wireless communications are then possible between the vehicle 12 and the mobile device 14, as the shared secret (the session key s) ensures that no eavesdropping or Man-In-The-Middle is possible.

Figure 5:
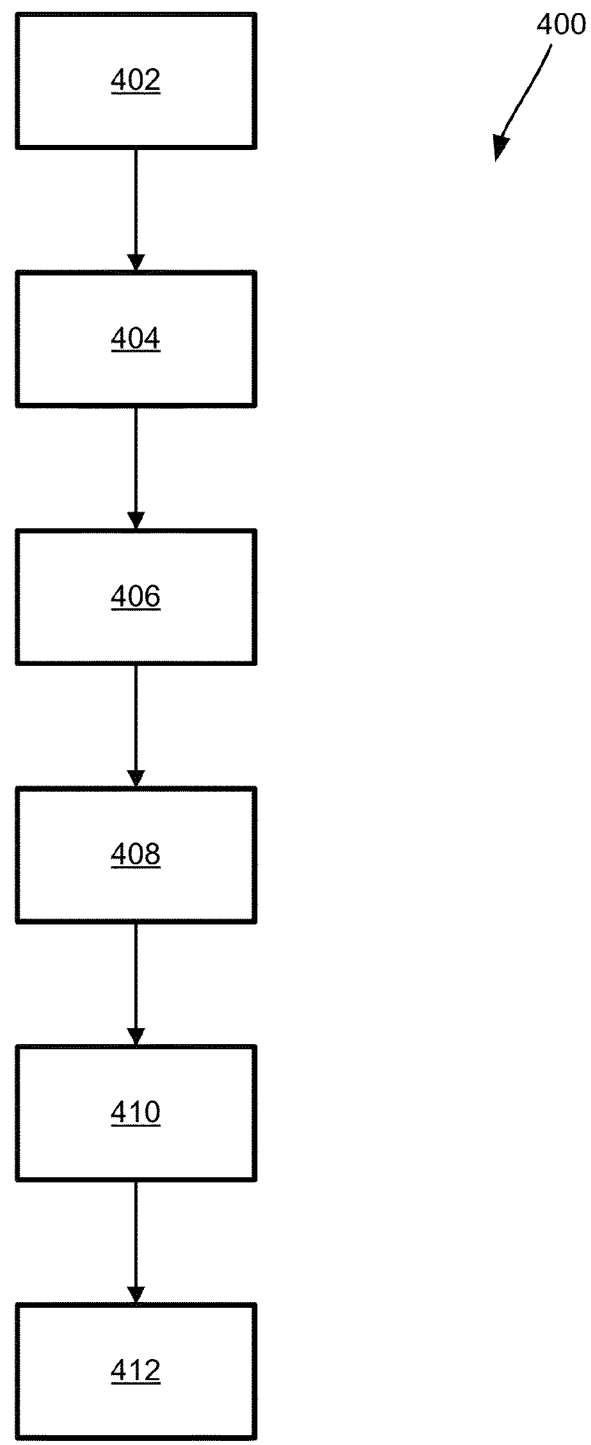
FIG. 5 is a flowchart diagram of the second embodiment of the method for secure pairing of a mobile device with a vehicle using the OnStar system to establish trust.

FIG. 5 is a flowchart diagram 400 of the second embodiment of the method for secure pairing of the mobile device 14 with the vehicle 12 using the OnStar server 24 to establish trust, as detailed above in the discussion of FIG. 4. At box 402, the mobile device 14 sends a pairing request to the vehicle 12, including a message containing the address of the device 14 (ADDR_D) and the request identification number (Req). At box 404, the device 14 generates an ephemeral pair of private/public keys and creates a message m2 consisting of the ephemeral public key of the device 14 (EPuD), the device address (ADDR_D), a device counter (CNT_D) and a timestamp (T). The device 14 then signs the message m2 with its own static private key, creating a signature SG2, and sends to the OnStar server 24 the message m2 concatenated with the signature SG2. The OnStar server 24 validates the signature SG2 and recovers the message m2.

At box 406, the vehicle 12 generates an ephemeral pair of private/public keys and creates a message m3 consisting of the ephemeral public key of the vehicle 12 (EPuV), the vehicle's device address (ADDR_V), a vehicle counter (CNT_V) and a timestamp (T). The vehicle 12 then signs the message m3 with its own static private key, creating a signature SG3, and sends to the OnStar server 24 the message m3 concatenated with the signature SG3. The OnStar server 24 validates the signature SG3 and recovers the message m3.

At box 408, the OnStar server 24 notifies the vehicle 12 of the device's ephemeral public key, and notifies the device 14 of the vehicle's ephemeral public key. The OnStar server 24 first creates a message m4 consisting of the ephemeral public key of the device 14 (EPuD), the device's address (ADDR_D), a counter belonging to OnStar (CNT_O) and a timestamp (T). The OnStar server 24 then signs the message m4 with its own static private key, creating a signature SG4, and sends to the vehicle 12 the message m4 concatenated with the signature SG4. The vehicle 12 validates the signature SG4 and recovers the message m4. Also at the box 408, the OnStar server 24 creates a message m5 consisting of the ephemeral public key of the vehicle 12 (EPuV), the vehicle's device address (ADDR_V), a counter belonging to OnStar (CNT_O) and a timestamp (T). The OnStar server 24 then signs the message m5 with its own static private key, creating a signature SG5, and sends to the device 14 the message m5 concatenated with the signature SG5. The device 14 validates the signature SG5 and recovers the message m5.

At box 410, the vehicle 12 computes a session key s using the Diffie-Hellman algorithm applied to the ephemeral private key of the vehicle 12 (which it owns and knows) and the ephemeral public key of the device 14 (which it just received in a message from the OnStar server 24). The vehicle 12 also generates a random number r, and creates a message c1 as a concatenation of the random number r with the vehicle's device address ADDR_V, symmetrically encrypted using the session key s as a secret key. The vehicle 12 sends the message c1 as a secrecy challenge to the mobile device 14.

At box 412, the device 14 computes the same session key s using the Diffie-Hellman algorithm applied to the ephemeral public key of the vehicle 12 (which it just received in a message from the OnStar server 24) and the ephemeral private key of the device 14 (which it owns and knows). The device 14 is thus able to decrypt the secrecy challenge message c1 received from the vehicle 12, and learn the random number r. The device 14 then creates a message c2 as a concatenation of the random number r with the device's address ADDR_D, symmetrically encrypted using the session key s as a secret key. The device 14 sends the message c2 back to the vehicle 12 as a response to the secrecy challenge. The vehicle 12 admits the mobile device 14 into the Wi-Fi network upon verifying the correctness of the random number r.

Both the methods of the first embodiment (FIGS. 2 and 3) and the second embodiment (FIGS. 4 and 5) can be adapted to the secure pairing of a guest device (the mobile device 16) with the vehicle 12. In the guest device adaptation, before the OnStar server 24 sends its notifications to the vehicle 12 and the guest device 16, additional steps are added to notify the primary device (the mobile device 14, which is already on the vehicle's Wi-Fi network) of the guest device's request and to allow the primary device to grant (or deny) the request.

Using the methods outlined above, secure Wi-Fi communications can be established between vehicles and mobile devices, without requiring users to manually enter lengthy passwords or PIN codes, by using OnStar or another telematics service as a trusted out-of-band medium. By providing both the convenience of a single button push and the security of encrypted Wi-Fi communications, these methods offer users an ideal solution for in-vehicle mobile device connectivity.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for secure pairing of mobile devices with a vehicle, said method comprising:
providing a first secure communications channel between the vehicle and a telematics server, and a second secure communications channel between a mobile device and the telematics server;
requesting access to a vehicle's Wi-Fi network by the mobile device;
providing a device address for the vehicle and a device address for the mobile device in a digitally signed message from the vehicle to the telematics server over the first secure communications channel;
providing security data to the vehicle in a first message over the first secure communications channel and to the mobile device in a second message over the second secure communications channel by the telematics server, where the security data can be used to establish a trust between the vehicle and the mobile device;

issuing a secrecy challenge by the vehicle to the mobile device, where the secrecy challenge is encrypted using a secret key included in or derived from the security data from the telematics server;

responding to the secrecy challenge by the mobile device to the vehicle, where the secret key is also known and used by the mobile device; and establishing secure Wi-Fi communications between the vehicle and the mobile device upon a valid response to the secrecy challenge.

2. The method of claim 1 wherein providing security data to the vehicle and the mobile device by the telematics server includes sending a session key generated by the telematics server in an encrypted, digitally signed message to both the vehicle and the mobile device.

3. The method of claim 2 wherein issuing a secrecy challenge includes generating a random number and symmetrically encrypting the random number by the vehicle using the session key as the secret key.

4. The method of claim 3 wherein responding to the secrecy challenge includes the mobile device using the session key as the secret key to decrypt the secrecy challenge from the vehicle, and using the session key as the secret key to symmetrically encrypt a message to the vehicle containing the random number.

5. The method of claim 1 wherein providing information about the vehicle and the mobile device to a telematics server includes each of the vehicle and the mobile device generating an ephemeral private/public key pair, and each of the vehicle and the mobile device creating a digitally signed message including its ephemeral public key, its device address, a counter and a timestamp, and sending the message to the telematics server.

6. The method of claim 5 wherein providing security data to the vehicle and the mobile device by the telematics server includes sending the ephemeral public key and the device address of the mobile device to the vehicle, and sending the ephemeral public key and the device address of the vehicle to the mobile device.

7. The method of claim 6 wherein issuing a secrecy challenge includes generating a random number and symmetrically encrypting the random number by the vehicle using a session key, generated by performing a Diffie-Hellman calculation on the ephemeral private key of the vehicle and the ephemeral public key of the mobile device, as the secret key.

8. The method of claim 7 wherein responding to the secrecy challenge includes the mobile device using the session key, generated by performing the Diffie-Hellman calculation on the ephemeral public key of the vehicle and the ephemeral private key of the mobile device, as the secret key to decrypt the secrecy challenge from the vehicle, and using the session key as the secret key to symmetrically encrypt a message to the vehicle containing the random number.

9. The method of claim 1 further comprising obtaining permission from a primary mobile device for Wi-Fi network admission of a guest mobile device, by the telematics server, before providing the security data to the vehicle and the guest mobile device.

10. A method for secure pairing of a mobile device with a vehicle, said method comprising:

providing a first secure communications channel between the vehicle and a telematics server, and a second secure communications channel between the mobile device and the telematics server;

requesting access to a vehicle's Wi-Fi network by the mobile device;

providing information about the vehicle and the mobile device to the telematics server, including each of the vehicle and the mobile device generating an ephemeral private/public key pair, and each of the vehicle and the mobile device creating a digitally signed message including its ephemeral public key, its device address, a counter and a timestamp, and sending the message to the telematics server;

providing security data to the vehicle and the mobile device by the telematics server, including sending the ephemeral public key and the device address of the mobile device to the vehicle over the first secure communications channel, and sending the ephemeral public key and the device address of the vehicle to the mobile device over the second secure communications channel;

issuing a secrecy challenge by the vehicle to the mobile device, including generating a random number and symmetrically encrypting the random number by the vehicle using a session key, generated by performing a Diffie-Hellman calculation on the ephemeral private key of the vehicle and the ephemeral public key of the mobile device, as the secret key;

responding to the secrecy challenge by the mobile device to the vehicle, including the mobile device using the session key, generated by performing the Diffie-Hellman calculation on the ephemeral public key of the vehicle and the ephemeral private key of the mobile device, as the secret key to decrypt the secrecy challenge from the vehicle, and using the session key as the secret key to symmetrically encrypt a message to the vehicle containing the random number; and establishing secure Wi-Fi communications between the vehicle and the mobile device upon a valid response to the secrecy challenge.

11. The method of claim 10 further comprising obtaining permission from a primary mobile device for Wi-Fi network admission of a guest mobile device, by the telematics server, before providing the security data to the vehicle and the guest mobile device.

12. A system for secure pairing of mobile devices with vehicles, said system comprising:

a vehicle hosting a Wi-Fi network;

a mobile device desiring access to the vehicle's Wi-Fi network;

a telematics server configured to provide security data to the vehicle and the mobile device, where the security data can be used to establish a trust between the vehicle and the mobile device;

a first secure communications channel between the vehicle and the telematics server; and a second secure communications channel between the mobile device and the telematics server; where:

the vehicle sends a digitally signed message to the telematics server over the first secure communications channel identifying a device address of the vehicle and a device address of the mobile device;

the telematics server generates a session key and sends the session key in a first encrypted, digitally signed message to the vehicle over the first secure communications channel and in a second encrypted, digitally signed message to the mobile device over the second secure communications channel;

the vehicle issues a secrecy challenge to the mobile device, including generating a random number and symmetrically encrypting the random number by the vehicle using the session key received from the telematics server as a secret key;

the mobile device responds to the secrecy challenge, including the mobile device using the session key as the secret key to decrypt the secrecy challenge from the vehicle, and using the session key as the secret key to symmetrically encrypt a message to the vehicle containing the random number; and the vehicle establishes secure Wi-Fi communications with the mobile device upon receiving a valid response to the secrecy challenge.

13. The system of claim 12 wherein the first and second secure communications channels include a cellular service provider connection from the vehicle and the mobile device to the Internet, and a connection from the Internet to the telematics server.

14. The system of claim 12 wherein:

each of the vehicle and the mobile device generate an ephemeral private/public key pair, and each of the vehicle and the mobile device creates a digitally signed message including its ephemeral public key, its device address, a counter and a timestamp, and sends the message to the telematics server;

the telematics server sends the ephemeral public key and the device address of the mobile device to the vehicle, and sends the ephemeral public key and the device address of the vehicle to the mobile device;

the vehicle issues a secrecy challenge to the mobile device, including generating a random number and symmetrically encrypting the random number by the vehicle using a session key, generated by performing a Diffie-Hellman calculation on the ephemeral private key of the vehicle and the ephemeral public key of the mobile device, as the secret key;

the mobile device responds to the secrecy challenge, including the mobile device using the session key, generated by performing the Diffie-Hellman calculation on the ephemeral public key of the vehicle and the ephemeral private key of the mobile device, as the secret key to decrypt the secrecy challenge from the vehicle, and using the session key as the secret key to symmetrically encrypt a message to the vehicle containing the random number; and the vehicle establishes secure Wi-Fi communications with the mobile device upon receiving a valid response to the secrecy challenge.

15. The system of claim 12 wherein the telematics server is configured to obtain permission from a primary mobile device for Wi-Fi network admission of a guest mobile device before providing the security data to the vehicle and the guest mobile device.

* * * * *